UNITED STATES PATENT OFFICE.

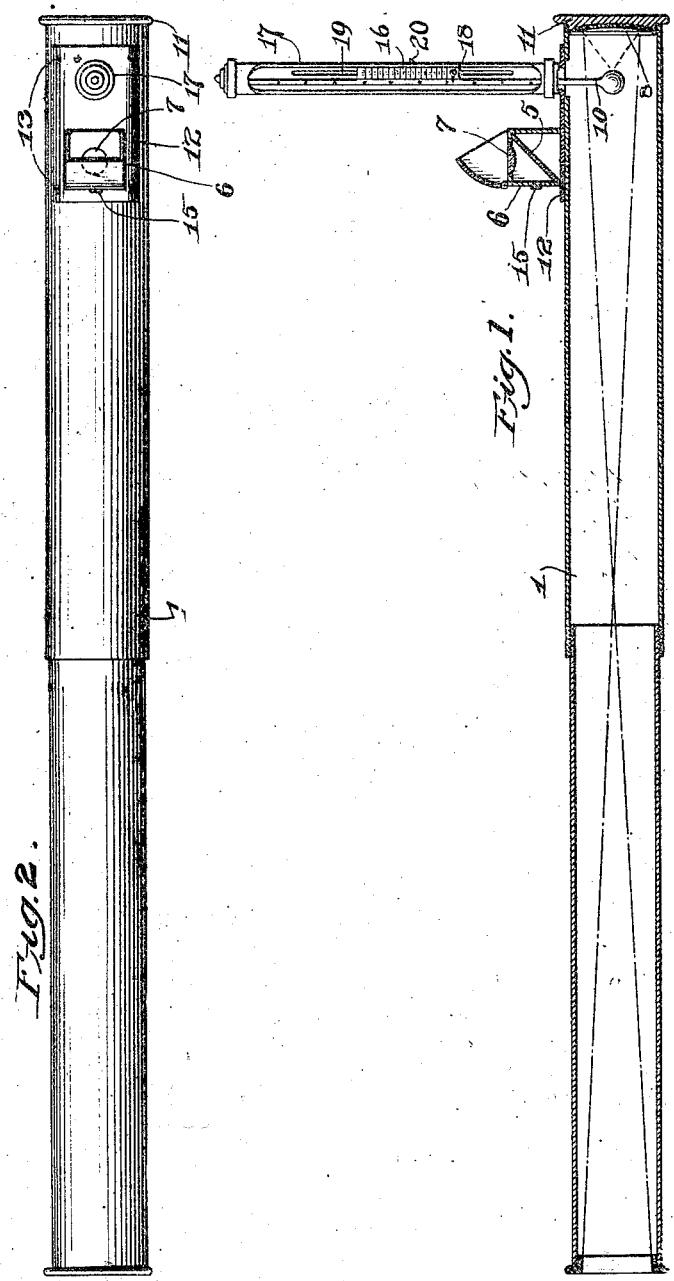

RICHARD P. BROWN, OF PHILADELPHIA, PENNSYLVANIA.

RADIATION-PYROMETER.

1,089,743.   Specification of Letters Patent.   Patented Mar. 10, 1914.

Application filed June 2, 1910. Serial No. 564,593.

*To all whom it may concern:*

Be it known that I, RICHARD P. BROWN, a citizen of the United States, and a resident of the city and county of Philadelphia, State of Pennsylvania, have invented certain new and useful Improvements in Radiation-Pyrometers, of which the following is a specification.

My invention relative to improvements in pyrometers and more particularly to improvements in that type of pyrometer used to measure the radiant heat of a body, and the object of my invention is to furnish in connection with such a pyrometer a means which will serve the double purpose of a sight for directing the pyrometer to the object the temperature of which is to be measured and for visually indicating whether or not the pyrometer is at a proper distance from the hot object in order to obtain a correct reading.

My invention is illustrated in the accompanying drawings, in which,

Figure 1 is a central longitudinal sectional elevation of a radiation pyrometer embodying my invention; and Fig. 2, a plan of Fig. 1.

1 is the pyrometer tube, 8 a condensing mirror, 10 a heat sensitive member, in the present case a thermometer, upon which the heat rays entering the tube at its front end are focused by the mirror. 11 is a removable cap carrying the mirror 8, 16 a sliding scale carried by the case 17 which protects the thermometer, 18 a pointer carried by scale 16. The case 17 is slotted at 19. 20 is a screw and thumb nut for securing the scale to case 17. All of these parts are so well known that detailed description of them will be unnecessary.

The tube 1 is provided with a reflecting device which constitutes an operative part of the pyrometer. This reflecting device, which in its structure is similar to the ordinary camera finder, is disposed on the tube normally in fixed relation to the open end thereof; to the heat sensitive device and to the heat ray concentrator. The reflecting device has a field of incidence corresponding to the field of incidence of such tube. The reflecting device is operative to perform the function of sighting the radiant object and also the function of indicating by an exclusively incandescent image of reflection a proper temperature registering range of the instrument for registering the temperature of the radiant object through the heat rays which enter said tube from the radiant object simultaneously with the entry in the reflecting device of the light rays forming such incandescent image.

The term incandescent image of reflection as here used has reference exclusively to the red heat or white heat of a radiant object as seen through the observation opening of a furnace in blast or other exposure of such object.

12 is a plate secured to the outside of the tube 1.

6 is a box, carried by plate 12, which carries an inclined mirror 5.

15 is an aperture in the front of the box 6, 7 a lens closing the top of box 6. The mirror 5 is placed at or about 45 degrees with a line parallel with the axis of tube 1.

The relation between the finder and the opening at the front end of the tube 1, the length of this tube, and the location of the condensing mirror therein being constant, and the finder being so designed that its field of view corresponds with that of the tube 1 it follows that an object will be seen through the finder precisely as it would be seen through the tube. In order that correct readings may be obtained by radiation pyrometers it is necessary that rays from the hot object only enter the tube, for instance, if it be desired to measure the temperature of the interior of a furnace the rays from the furnace opening only, to the exclusion of any from objects surrounding the opening, should enter the tube, hence if an observer looking through the finder sees therein the full furnace opening and does not see any of the sides of this opening, he knows that his instrument is directed to the opening and is at the proper distance therefrom to obtain a correct indication of its temperature.

In instruments of this class it is immaterial how close the instrument is to the hot body, it must not, however, be far enough away to permit the entrance of rays other than those passing from the hot body itself.

Having thus described my invention I claim as new and desire to secure by Letters Patent:

A radiation pyrometer for registering the radiant heat of an object, said instrument comprising a tube open at one end for the entrance of the heat rays from said object, a heat sensitive device carried interiorly of said tube, a temperature indicator carried exteriorly of said tube and connected with said heat sensitive device, a ray concentrator operative to concentrate the heat rays entering said tube upon said heat sensitive device, and a reflecting device disposed on said tube normally in fixed relation to said open end, said heat sensitive device and said concentrator and having a field of incidence corresponding with the field of incidence of said tube and operative to perform the double function of sighting the radiant object and indicating by an exclusively incandescent image of reflection a proper temperature registering range of the instrument for registering the temperature of the radiant object through the heat rays entering said tube from said object simultaneously with the entry in the reflecting device of the light rays forming said image.

RICHARD P. BROWN.

Witnesses:
A. H. VAIL,
CHARLES A. RUTTER.